United States Patent
Wagner

[15] 3,662,451
[45] May 16, 1972

[54] HYDRAULIC PULLER APPARATUS FOR ATTACHING A COUPLING TO A HOSE

[72] Inventor: John B. Wagner, Racine, Wis.

[73] Assignee: Webster Electric Company, Inc., Racine, Wis.

[22] Filed: July 30, 1970

[21] Appl. No.: 59,461

[52] U.S. Cl. ................................................29/237, 29/252
[51] Int. Cl. ..............................................................B23p 19/04
[58] Field of Search.....................29/237, 263, 272, 282, 252

[56] References Cited

UNITED STATES PATENTS

| | | | |
|---|---|---|---|
| 2,298,379 | 10/1942 | Hoffman | 29/237 X |
| 2,317,405 | 4/1943 | Rutten | 29/263 |
| 3,469,298 | 9/1969 | Pizzagalli | 29/237 |
| 245,055 | 8/1881 | Callahan | 29/237 |

Primary Examiner—Andrew R. Juhasz
Assistant Examiner—Leon Gilden
Attorney—Mason, Kolehmainen, Rathburn & Wyss

[57] ABSTRACT

A coupling or fitting is attached to one end of a hose by means of a novel attachment mechanism. Attachment is accomplished by placing a fitting over the end of the hose and by pulling on an internal portion of the fitting. The novel attachment mechanism uses a hydraulic puller to pull on the internal portion of the fitting. A pull cap and a pull shaft are used to connect the internal portion of the fitting to the hydraulic puller and the pulling is quickly carried out hydraulically. When the pull shaft is then pushed back into the hose, the pull cap automatically disengages and the entire attachment mechanism is removed through the fitting.

9 Claims, 3 Drawing Figures

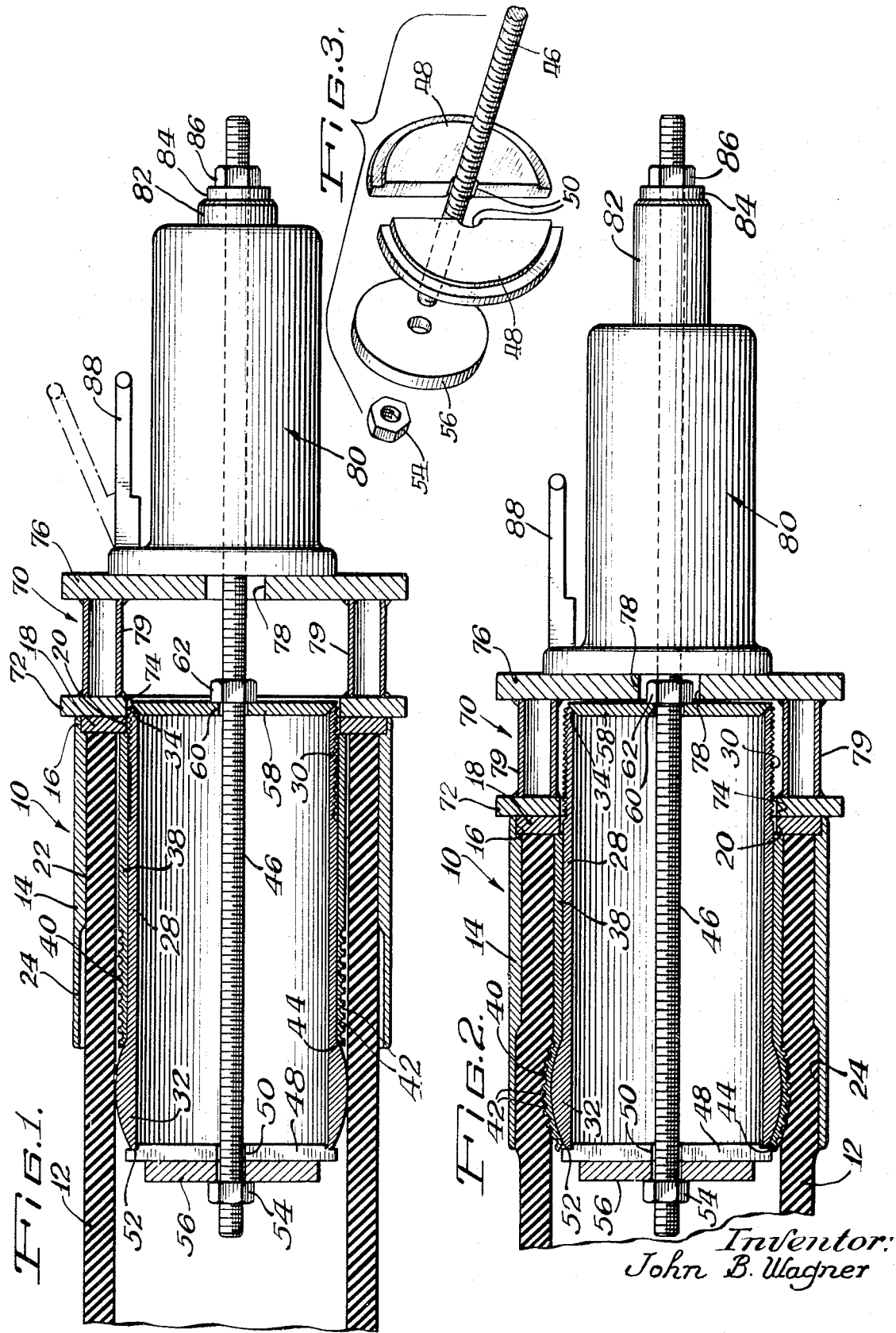

HYDRAULIC PULLER APPARATUS FOR ATTACHING A COUPLING TO A HOSE

This invention relates to apparatus for attaching a coupling to a fluid conduit such as a hose, which may be used for transferring liquids or gases under pressure or a vacuum. Conduits provided with couplings are utilized in connection with various apparatus such as in hydraulic systems, hydraulic cylinders, pumps, tanks, hoppers, pipelines, and for various industrial purposes.

In particular the present invention is directed to apparatus which is suitable for attaching couplings to hoses wherein the couplings are of the general type disclosed in U. S. Pats. No. 3,211,476 dated Oct. 12, 1965, and No. 3,490,793 dated Jan. 20, 1970, wherein certain of the elements of the coupling, incident to axial movement of the innermost element, serve to compress and firmly grip the hose to secure the coupling efficiently and effectively to the hose.

It has been found that in applying couplings of the type disclosed in the aforesaid patents to a hose that it sometimes requires the application of a substantial physical effort by the use of conventional tools. This problem is especially difficult and laborious when applying a coupling of proper size to a relatively large diameter hose such as 4 inches or greater. The problem of proper attachment of a coupling to a hose also exists and is rendered more difficult and laborious when the hose is of a reinforced type, such as when the hose has wire strands or wire mesh or fabric embedded therein.

Accordingly, several objects of the present invention are to provide a novel form of apparatus for effectively attaching the proper size coupling to a hose of relatively large diameter; wherein the apparatus is relatively inexpensive to manufacture and permits quick and easy attachment of a coupling to a hose by the use of a hydraulic puller; and wherein once the fitting has been attached to a hose, the apparatus may be easily removed from the hose even when only one end of the hose is accessible.

Briefly stated, the present invention comprises an attachment mechanism which can be extended into a hose and which can grip a fitting from within the hose so that an internal portion of the fitting can be pulled part way out of the hose. The preferred embodiment comprises a puller such as a hydraulic puller, a pull rod extending from the hydraulic puller into the hose, and a pull cap which transmits forces from this pull rod to the interior of the fitting. The pull cap is formed of a multiplicity of segments arranged to pass force in one direction only. When the internal portion of the fitting is extracted from the hose, the pull cap transmits the hydraulically generated force from the pull rod to the fitting. After the hydraulic extraction has been completed, the pull rod is pushed back into the hose. This permits the pull cap to fall apart into segments. The pull rod and the pull cap segments are then easily removed from within the hose through the newly attached fitting. The full rod and cap do not have to be removed from the opposite end of the hose.

The hydraulic device is separated from the end of the hose by a saddle or spacer. This saddle transmits compressive forces between the hydraulic puller and the edges of the hose but leaves sufficient room adjacent the opening at the end of the hose for a portion of the fitting to be extracted entirely out of the hose under the impetus of the hydraulic puller. The size of this saddle determines the maximum distance which the pull rod can be withdrawn from the hose and thereby automatically delimits the actual motion of the pull rod to the desired range.

The above and other objects and advantages of the present invention appear in connection with the following detailed description of an embodiment of the invention as shown in the drawing, wherein:

FIG. 1 is an axial sectional view of a hose with a coupling in an initial unattached position on the end thereof, together with the apparatus for attaching the coupling to the hose, including a hydraulic puller which is shown in side elevation;

FIG. 2 is an axial section, similar to FIG. 1, showing the position of the parts after the coupling elements have been moved into final cooperating relation for a firm and permanent attachment to the end of the hose and prior to the removal of the apparatus embodying the invention; and FIG. 3 is an exploded view of the pull rod, the pull cap, the bearing washer, and the nut shown in FIGS. 1 and 2 of the drawings.

Referring now to FIGS. 1 and 2 of the drawing, a coupling or fitting 10 is fixedly attached to the end of a hose 12 which may be understood to be of any suitable material such as rubber or synthetic rubber. For certain conditions of use, such as where the hose desirably should be able to withstand high bursting pressures, the hose may be of the type having wire strands or wire mesh or fabric embedded therein.

The apparatus embodying the present invention is shown in the drawing in connection with a coupling for a hose of relatively large diameter, such as 4 inches and larger. For such large size hoses, the couplings desirably are modified slightly in detail construction with respect to the couplings disclosed in the aforesaid patents. While, as shown in the above mentioned patents, the body of the coupling is a single unitary piece of the type that is normally formed on a screw machine or a lathe and that is suitable for use on hoses of smaller diameters than 4 inches, it is preferable for couplings used with larger diameter hoses that they be fabricated in two pieces for economy in manufacture.

As may be seen in the drawing, the coupling 10 includes a cup-shaped body comprising a tubular or cylindrical section of metal as indicated at 14, the outer end of which is counter-bored at 16 and into which counterbore is press fitted and welded an end plate or wall 18, having a central opening 20. The interior of the body 14 is provided with a cylindrical bore 22, the innermost end of which body is counterbored, as indicated at 24, for accommodating a portion of the rubber of the hose displaced incident to affixing of the coupling in place on the hose.

Positioned axially within the body 14 is a tubular coupling member 28 having a main shank portion which extends through the opening 20, in the end wall of the body, and the outer end portion of the shank is threaded as indicated at 30. The opposite or inner end of the tubular coupling member is formed with an enlarged portion 32 which is in the form of a segment of a sphere and which constitutes an expansion head and the outermost end of the tubular member is chamfered internally, as indicated at 34, to form a frusto conical surface. The tubular coupling member 28 desirably is formed of metal such as steel, and the expansion head 32 is heat treated for hardness. As may be seen in FIG. 1 of the drawing, the diameter of the expansion head is substantially equal to or may be slightly greater than the inner diameter or bore of the hose 12.

Telescoped over the shank portion of the tubular coupling member 28 is a tubular pressure element 38, the outer diameter of which initially is slightly less than the inner diameter of the bore of the hose, as seen in FIG. 1 of the drawing. The innermost end portion of the pressure element, as indicated at 40, is formed with a plurality of axially spaced circumferential grooves 42 which reduces the cross section of metal of the pressure element of therewith innermost end portion. As may be seen in FIG. 1 of the drawing, the outer end of the pressure element, when initially assembled in the hose with the body 14 in place, abuts against the end wall 18 of the body. The innermost end of the pressure element is counterbored to provide an inclined frusto conical surface 44 for cooperative engagement with and to facilitate movement over the spherical outer surface of the expansion head 32 of the coupling member 28.

The pressure element may be formed of any suitable material, preferably one possessing ductile characteristics, such as annealed steel tubing. The inner end portion 40 of the pressure element 38, containing grooves 42, is transaxially deformed and enlarged, as will hereinafter be referred to, as the tubular coupling member 28 is moved in an outward direction incident to connecting the coupling to the hose. For certain uses, where the coupling is employed with hoses or conduits handling medium or low fluid pressures, said pressure element 38 may be formed of copper, bronze, or synthetic material.

The apparatus embodying the present invention is partially assembled with the tubular coupling member 28 and the pressure element 38 prior to insertion into the hose. The apparatus includes a threaded pull rod 46 which is extended through the assembly of the coupling member 28 and pressure element 38, and associated with the innermost end of the rod is a pull cap 48, formed of a multiplicity of segments which when assembled together form a disc, and the segments are formed to provide a central aperture 50 to accommodate the pull rod 46. The marginal edge portions of the segments are shouldered as indicated at 52 for a seating against and in the innermost end of the coupling member 28. As represented in FIG. 3, the disc or pull cap 48 is made up of two semicircular segments and the segments are held in place with respect to the coupling member by a nut 54, with a bearing washer 56 interposed therebetween. A locking cap 58, in the nature of a disc, has its periphery chamfered for a snug fit within the outer chamfered end of the tubular coupling member 28 and is provided with an aperture 60 for accommodating the rod 46 therein and the disc 58 is secured in place by a nut 62 on rod 46. When the disc elements 48 and 58 are positioned at opposite ends of the coupling member 28 and the nuts 54 and 62 tightened, the pull rod 46 is then firmly attached to the pressure element.

The assembly of the tubular coupling member on the pull rod 46 with the pressure element telescoped over the coupling member is then inserted into the hose 12 and the cup-shaped body 14 is then placed over the pull rod, in surrounding relation to the hose with the inner surface of the end wall 18 abutting the outer end of the pressure element 38 to properly position all of the parts of the coupling initially with respect to the hose, as seen in FIG. 1 of the drawing. A spacer saddle 70 is then placed in proper position over the pull rod in abutting relation to the outer surface of the end wall 18 of the body. The spacer saddle comprises a rectangular plate 72 having a circular opening 74 of a size substantially the same as the opening 20 in the end wall of the body. A second rectangular plate 76 is spaced outwardly with respect to the plate 72 and has a central opening 78 of a size to insure clearance for an accommodation of the nut 62 on the pull rod. The two plates 72 and 76 are interconnected in spaced apart relation, by a plurality of tubular elements 79 which are welded at their ends to the adjacent opposite face of said plates for rigidly securing them together as a unit to constitute a spacer saddle.

After the assembly comprising the pull rod 46 and tubular coupling member 28 with the pressure element 38 surrounding the coupling member 28 has been inserted into the bore of the hose and the housing or body 14 is applied over the end of the hose as seen in FIG. 1, the spacer saddle 70 is then mounted over the pull rod 46, so as to abut against the end wall of the body 14, after which a pulling device, such as a hydraulic puller, as indicated at 80, is attached to the pull rod 46. The hydraulic puller 80 may be of a conventional type such as one known as SIMPLEX-Central Hole Hydraulic Puller in which the piston therein includes a hollow piston rod 82. The puller is then placed in position with the pull rod extending through the hollow piston rod 82, and a washer 84 is placed against the outer end of the piston rod and a nut 86 is threaded on the rod so as to firmly secure the spacer saddle and hydraulic puller in assembled relation to the coupling as initially applied to the end of the hose, as seen in FIG. 1 of the drawing. The hydraulic puller 80 includes a control handle 88 which, when operated, causes hydraulic fluid to move the piston outwardly and the piston rod 82 is caused to extend outwardly, as seen in FIG. 2 of the drawing. Simultaneously with movement of the piston rod 82, the puller rod 46, due to its connection to the coupling member 28, pulls the coupling member in an outward direction and in so doing forces the expansion head 32 of the coupling member 28 to radially expand the deformable portion 40 of the pressure element 38 so that the deformable portion 40 conforms to the shape of the expansion head 32. Such action compresses the body of the hose 12 between the deformable portion of the pressure element 38 and the wall of the counterbore 24, at the inner end of the body, as seen in FIG. 2. The pressure exerted by reason of such expansion of the pressure element results in firmly and positively locking the coupling 10 to the hose 12. The grooves 42 in the deformable portion of the pressure element serve to augment the locking or gripping action on the hose to insure firm securement of the coupling in place on the hose.

As may be seen in FIG. 2 of the drawing, as the pull rod 46 is moved to its outermost position, the opening 78 in the plate 76 accommodates the nut 62 therein. It is to be understood that the parts are so dimensioned that when the cap or disc 58 approaches contact with the inner surface of the saddle plate 78, the operating handle 88 of the hydraulic puller is actuated to relieve the fluid pressure therein. The nut 86 and washer 84 are then removed from the pull rod so that the hydraulic puller 80 may be removed from its seated position with respect to the spacer saddle 70 and the spacer saddle likewise may be removed from the pull rod.

After the coupling elements have assumed their final position of adjustment for firm securement to the hose, and after the hydraulic puller and saddle are removed, the nut 62 is backed away a substantial distance from the disc 58 so that the pull rod may be moved inwardly into the hose, so as to permit disengagement of the multi-segments of the disc 48 with respect to the inner end of the coupling member. Because the disc 48 is made up of two or more segments, the disc segments fall free with respect to the rod 46. The pull rod 46 together with the disc 58 and washer 56 may then be withdrawn from the interior of the coupling in its assembled relation to the hose. The segments comprising the disc 48 may then be removed from the hose in any suitable manner, for example, by shaking them out of the hose. If the hose is large enough, the segments can be grasped by a suitable tool or even by hand and then removed from the hose.

After the apparatus has been totally removed with respect to the coupling and the hose, the parts of the coupling are firmly and finally secured in a permanent manner with respect to the hose by placing a threaded pipe flange (not shown) on the threaded portion 30 of the tubular coupling member, which pipe flange may be subsequently employed for connection to a correspondingly apertured pipe flange or other apertured member of the hydraulic system to which the hose is to be attached. If desired a nut may be used in lieu of the pipe flange.

While the preferred embodiment of the present invention has been disclosed, it will be understood that numerous modifications and changes will occur to those skilled in the art. The claims accompanying this specification are intended to encompass all such changes and modifications as come within the true spirit and scope of the present invention.

What is claimed as new and desired to be secured by Letters Patent of the United States is:

1. In combination, apparatus for attaching a hydraulic coupling assembly to a hose, said assembly comprising a body having a cylindrical chamber and an end wall for telescoping over an end of a hose, a tubular coupling member for extending through an opening in the end wall of the body, the inner end of said member being formed with an enlarged expansion head dimensioned to be freely telescoped into the bore of the hose, and a tubular pressure element mounted on said coupling member and dimensioned for free telescoping movement into the bore of the hose and having an inner end portion of deformable material, said inner end portion being initially positioned adjacent said head and the other end abutting the end wall of the body; said apparatus comprising detachable connector means securable to opposite ends of said coupling member, and a puller operably connectible to said means for moving said coupling member axially outward with respect to said body, said head including a tapered wedging surface engaging said deformable end portion of the pressure element for radially expanding the same outwardly into permanent radial locking engagement with the inside surface of said hose upon relative axial displacement between said pressure element and said tubular element when said puller is operated, said radial expansion of said pressure element into said hose firmly squeezing said hose outwardly against the cylindrical wall of the chamber of said body, said expansion head including a second, oppositely tapered, wedging surface engaged by the deformed end portion of said pressure element for transmitting pullout thrust applied to said coupling member to said body end wall and hose in contact with said pressure element.

2. Apparatus as defined in claim 1, characterized by said detachable connector means including a part adapted to detachably engage an abutment surface on the coupling member and a spacer saddle for positioning in abutting relation to the end wall of the body of the coupling and the puller.

3. Apparatus as defined in claim 1, characterized by including a pull rod operably connectible to said puller, a multi-segment disc associated with the rod and positioned to abut the inner end of the coupling member, a locking cap associated with the rod and positioned to abut against the outer end of the coupling member and a spacer saddle positioned with one face abutting the outer end wall of the body and the other face abutting the adjacent end of the puller.

4. Apparatus as defined in claim 3 wherein said rod has threaded portions and nuts mounted on said rod to cause said disc and locking cap to be positioned in desired relation to the opposite ends of the coupling member.

5. Apparatus as defined in claim 1 wherein said detachable connector means includes a pull shaft; collapsible engagement means connecting said pull shaft to the inner end of said coupling member for pulling the coupling member toward the end of said hose when the pull shaft is withdrawn from the hose, said engagement means collapsible when the pull shaft is pushed into the hose and formed of individual segments dimensioned to be removable from the hose through the coupling member when collapsed, said puller including a first member connected to the pull shaft and a second member positioned to engage the end of the hose, and further including motive means for driving said first and second members with respect to one another.

6. Apparatus as defined in claim 5 wherein the collapsible engagement means comprises a segmented disc with an outer diameter sufficient to engage the movable member from within the hose, and wherein said pull shaft penetrates a hole in said segmented disc and includes an enlarged portion for engaging said disc on the hose side of the disc.

7. Apparatus as defined in claim 6 including additional engaging means attached to the pull shaft for engaging said other end of said coupling member, said pull shaft, said segmented disc, said additional engaging means, and said coupling comprising a complete subassembly inserted into said hose.

8. Apparatus as defined in claim 5 wherein the second member is separated from the end of the hose by a spacer having a peripheral portion which engages the hose perimeter and having an opening within said peripheral portion into which said coupling member is drawn under the impetus of the motive means.

9. Apparatus as defined in claim 8 wherein said puller and said spacer define a stop for limiting the maximum distance which the coupling member is withdrawn from the hose.

* * * * *